R. W. CHAPMAN.
SINUSOIDAL WAVE GENERATOR.
APPLICATION FILED MAR. 10, 1917.

1,268,545.

Patented June 4, 1918.

Inventor.
Ralph W. Chapman
by Heard Smith & Tennant.
Attys.

UNITED STATES PATENT OFFICE.

RALPH W. CHAPMAN, OF OLDTOWN, MAINE, ASSIGNOR TO T. M. CHAPMAN'S SONS' COMPANY, OF OLDTOWN, MAINE, A CORPORATION OF MAINE.

SINUSOIDAL-WAVE GENERATOR.

1,268,545.  Specification of Letters Patent.  Patented June 4, 1918.

Application filed March 10, 1917. Serial No. 153,993.

*To all whom it may concern:*

Be it known that I, RALPH W. CHAPMAN, a citizen of the United States, residing at Oldtown, county of Penobscot, State of Maine, have invented an Improvement in Sinusoidal-Wave Generators, of which the following description, in connection with the accompanying drawing, is a specification. like characters on the drawing representing like parts.

This invention relates to therapeutic apparatus of that type adapted to produce a sinusoidal current, and has for its principal object to provide a novel means for developing the desired surging or varying current which is simple in construction, which is easily adjusted for effecting variations in the character of the current, and which has other advantages, all as will be more fully hereinafter set forth.

In order to give an understanding of my invention, I have illustrated in the drawings a selected embodiment thereof which will now be described, after which the novel features will be pointed out in the appended claims.

In the drawings, Figure 1 is a horizontal sectional view through an apparatus embodying my invention taken on substantially the line 1—1, Fig. 2;

The apparatus herein shown comprises a plurality of connected coils and means for supporting them, a plurality of magnets arranged with their pole pieces adjacent said coils, means for causing a relative rotary movement between the coils and magnets whereby a current is induced in the coils, and automatic means for moving the pole pieces and coils periodically toward and from each other thereby to vary the strength of the current developed. The relative rotary movement between the coils and the magnet may be provided for either by rotating the coils or by rotating the magnets. In the construction herein shown, the coils are mounted upon a rotor while the magnets are mounted upon a stationary element.

Figure 3:
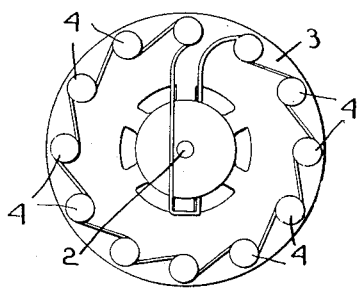
Fig. 3 is a view of the rotor and the coils thereon.
Figure 4:
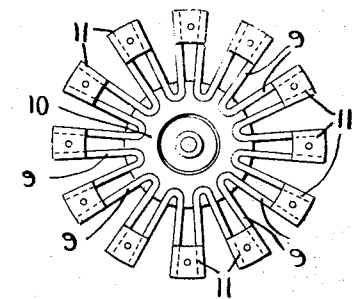
Fig. 4 is a view of the stationary magnets.

1 indicates a suitable casing within which the coils and the magnets are received. Journaled in this casing is a shaft 2 which may be driven by any suitable motor or power element. Fast on the shaft is a head or rotor 3 which carries a plurality of coils 4. These coils are arranged with their axes parallel to the shaft and they are connected in series, as shown in Fig. 3, and are connected to two collecting rings 5 and 6 which are insulated from each other and are fast to the shaft 2. Two brushes 7 and 8 engage the collecting rings, and these brushes are connected to the wires leading to the pads or other terminals which are applied to or taken hold of by the patient. The magnets which coöperate with the coils 4 for inducing the therapeutic current are indicated at 9. While magnets of any suitable construction might be employed, I have herein shown permanent horseshoe magnets which are rigidly secured to a non-rotating head or carrier 10. The adjacent poles of adjacent magnets are shown as connected by pole pieces 11. These magnets are arranged with the poles adjacent to and occupying the same zone as the cores of the coils 4. Hence as the coils are rotated, a current will be induced therein which is taken off through the brushes 7 and 8. Means are provided for adjusting the magnets and coils toward and from each other whereby the strength of the induced therapeutic current can be varied. When the magnets and coils are brought close together, the induced current will be stronger than when said magnets and coils are separated from each other. Any suitable means may be employed for moving the coils and magnets toward and from each other, but I will preferably use an automatic mechanism which accomplishes this result in such a way as to produce the desired sinusoidal current. The relative movement in an axial direction between the magnets 9 and the coils 4 may be secured by moving either element toward the other. I have herein illustrated a construction, however, in which the magnets are moved toward and from the coils 4. The head 10 is secured to two rods 12 that are slidably mounted in the end 13 of the casing 1, said rods being connected together at their outer ends by a yoke or connection 14. Rotatably mounted in the head 13 of the casing is a shaft section 15 which is coupled to the shaft 6 by means of a suitable coupling 16. This shaft section 15 is formed with a worm 17 which meshes with and drives a worm gear 11b 18 that is fast on a shaft 19 which is journaled in a gear casing 20. The shaft 19 of the worm 18 carries a cam 21 which is adapted to engage a roll 22 at the upper end of a lever 23 pivotally mounted intermediate of its ends on a fulcrum pin 24 and pivotally connected at its lower end, as shown at 25, to an arm 26 extending from a hub 27 that is fast on one of the rods 12. The roll 22 is held in engagement with the cam 21 by means of a spring 28, one end of which is secured to the casing, and the other end of which is secured to the yoke or connection 14. As the cam 21 rotates, the lever 23 will be oscillated about its fulcrum 24 and such oscillatory movement will be communicated to the rods 12 through the connection 26 and thus the head 10 will be reciprocated in an axial direction, thus moving the magnets 9 toward and from the coil. The current which is thus induced will vary in volume as the magnets are moved toward and from the coil. The particular character of the variations in the current will depend on the character of the cam 21. This cam may be such as to cause an even uniform variation in the current from one extreme to the other, or it may be such as to cause a rapid increase and a gradual decrease of the current, or it may be such as to cause other variations.

In order to permit cams 21 of different contour to be used, I propose to make the cam so that it can be readily removed from the machine. This permits any cam to be easily replaced by another cam when it is desired to change the character of the current. The gear casing 20 is shown as open at one side, this opening being closed by a suitable closure 29. The cam 21 is sustained on the square end 30 of the shaft 19 on the outside of the bearing 31 for the shaft, said shaft extending through the bearing for this purpose. The closure 29 is shown as having a retaining spring 32 thereon which engages the cam 21 when the closure is closed thereby holding the cam in position. This closure 29 is held in its operative position by a spring catch 33. The operation of changing cams 21 involves merely swinging the door or closure 29 open and then removing the cam from the squared end 30 of the shaft and replacing it by another cam having the desired contour.

I have also provided herein means whereby the amplitude of the axial movement of the head 10 may be varied, thus providing for varying the extreme limits for the waves of the current. If the amplitude of the axial movement of the magnets is relatively small, then the variations in the induced current will be correspondingly small, but if the amplitude of the axial movement of the magnets is increased, then the variations in the induced current will be correspondingly increased. I have herein provided for thus varying the amplitude of the axial movement of the magnets by making the fulcrum 24 adjustable longitudinally of the lever 23. An adjustment of the fulcrum toward the upper end of the lever will result in giving the head 10 a greater axial movement while an adjustment of the fulcrum toward the lower end of the lever will result in giving the head 10 a decreased movement.

Figure 1:
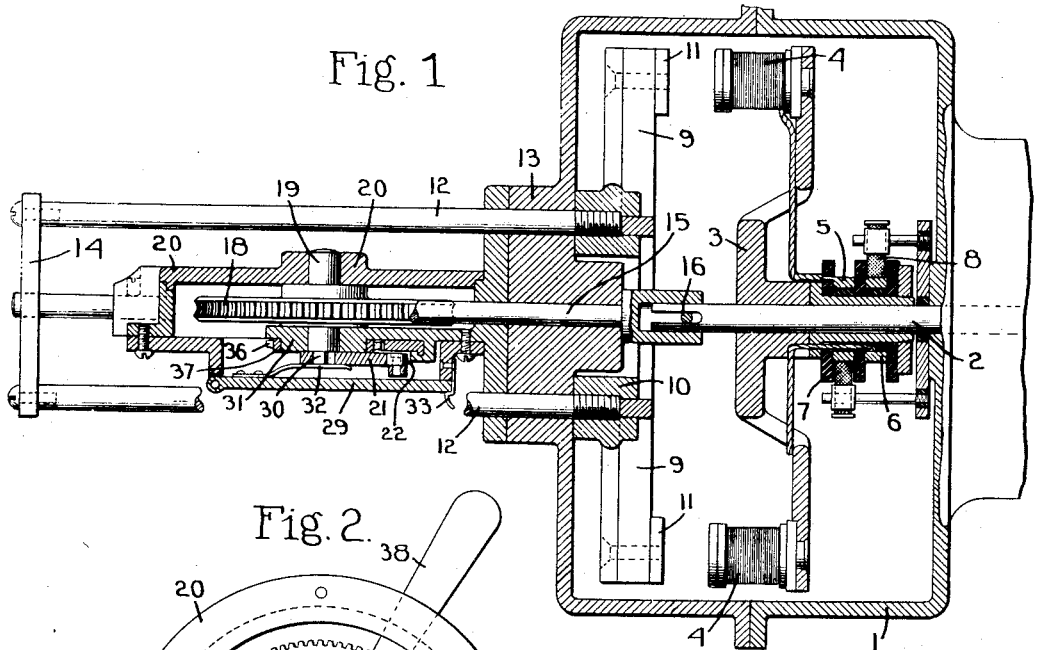
Figure 2:
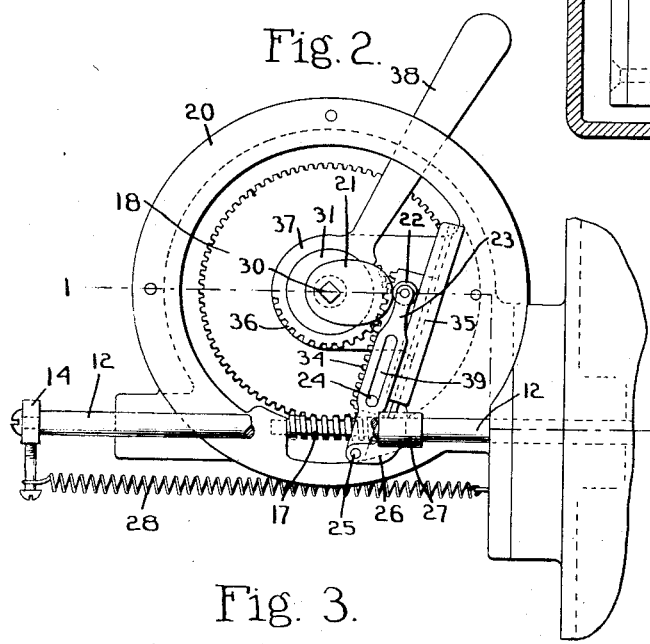
Fig. 2 is a side view of the invention, but with the cover for the gear casing removed.

The fulcrum 24 is shown as a fulcrum pin secured to and extending from a rack 34 which is movable vertically in a suitable guide 35, and the teeth of which mesh with teeth 36 formed on an adjusting member 37 that is mounted for rotation on the bearing 31. This member 37 has a handle 38 which extends through a slot in the gear casing 20 and by which the adjusting member 37 may be turned about its bearing. The swinging of the handle 38 to the left, Fig. 2, will operate to raise the rack 34, thus carrying the fulcrum pin 24 toward the upper end of the lever 23. Said lever is slotted at 39 to permit this movement of the fulcrum pin. The amplitude of the axial movement of the magnets 9 can thus be adjusted or changed by simply swinging the lever 38 in one direction or the other.

The apparatus herein described can thus be adjusted to give a current which will vary between relatively-narrow limits or between relatively-wide limits, and can also be adjusted to give a current having waves of different forms, depending upon the shape of the cam which is used.

I claim:

1. In a device of the class described, the combination of a plurality of coils, a plurality of magnets, means to rotate the coils and magnets relative to each other thereby to induce a current in the coils, and means to move the coils and magnets toward and from each other at regular time intervals.

2. In a device of the class described, the combination of a rotor, a plurality of coils carried thereby, a plurality of stationary magnets having their pole pieces adjacent said coils, means to give rotary movement to the rotor whereby current will be induced in the coils and means to move the coils and magnets toward and from each other periodically.

3. In a device of the class described, the combination of a rotor, a plurality of coils carried thereby, a plurality of stationary magnets having their pole pieces adjacent said coils, means to give rotary movement to the rotor whereby current will be induced in the coils, and means to move the magnets toward and from the coils periodically.

4. In a device of the class described, the combination of a plurality of coils, a plurality of magnets, means to rotate the magnets and coils relative to each other, and automatic means to move the coils and magnets periodically toward and from each other during their relative rotation.

5. In a device of the class described, the combination of a plurality of magnets, a plurality of coils, means to rotate said coils adjacent the magnets whereby a current is induced in the coils, and means operated by the coil-rotating means to move the coils and magnets toward and from each other periodically.

6. A device as specified in claim 1, in combination with means for varying the amplitude of the relative movement of the coils and magnets toward and from each other.

7. A device as specified in claim 5, in combination with means for varying the amplitude of the movement of the magnets toward and from the coil.

8. In a device of the class described, the combination of a plurality of coils, means to rotate said coils, a carrier, a plurality of magnets mounted on said carrier, a cam for moving the carrier with the magnets thereon toward and from the coils, and means to actuate said cam by the rotative movement of the coil-rotating means.

9. In a device of the class described, the combination of a casing, a shaft rotatably mounted therein, a plurality of coils supported on and rotating with said shaft, a carrier slidably mounted in the casing, a plurality of magnets thereon, a worm wheel journaled in said casing, means to rotate said worm wheel from said shaft, a cam rotatable with the worm wheel, and a lever actuated by said cam and connected to said carrier whereby rotation of the cam moves the magnets toward and from the coils.

10. A device as specified in claim 9, in combination with means for adjusting the position of the fulcrum of said lever thereby to vary the amplitude of movement of the carrier.

11. In a device of the class described, the combination of a casing, a shaft rotatably mounted therein, a plurality of connected coils supported on and rotating with said shaft, a carrier slidably mounted in the casing, a plurality of magnets thereon, a worm wheel journaled in the casing, means to rotate said worm wheel from said shaft, a cam detachably secured to said worm wheel, and means controlled by said cam for giving reciprocating movement to the carrier thereby to move the magnets periodically toward and from the coils.

12. In a device of the class described, the combination of a casing, a shaft rotatably mounted therein, a plurality of connected coils supported on and rotating with said shaft, a carrier slidably mounted in the casing, a plurality of magnets thereon, a worm wheel journaled in the casing, means to rotate said worm wheel from said shaft, a cam rotatable with the worm wheel, a lever actuated by said cam and connected to said carrier for moving the carrier in one direction, and a spring acting on the carrier for moving it in the opposite direction.

In testimony whereof, I have signed my name to this specification.

RALPH W. CHAPMAN.